INVENTOR.

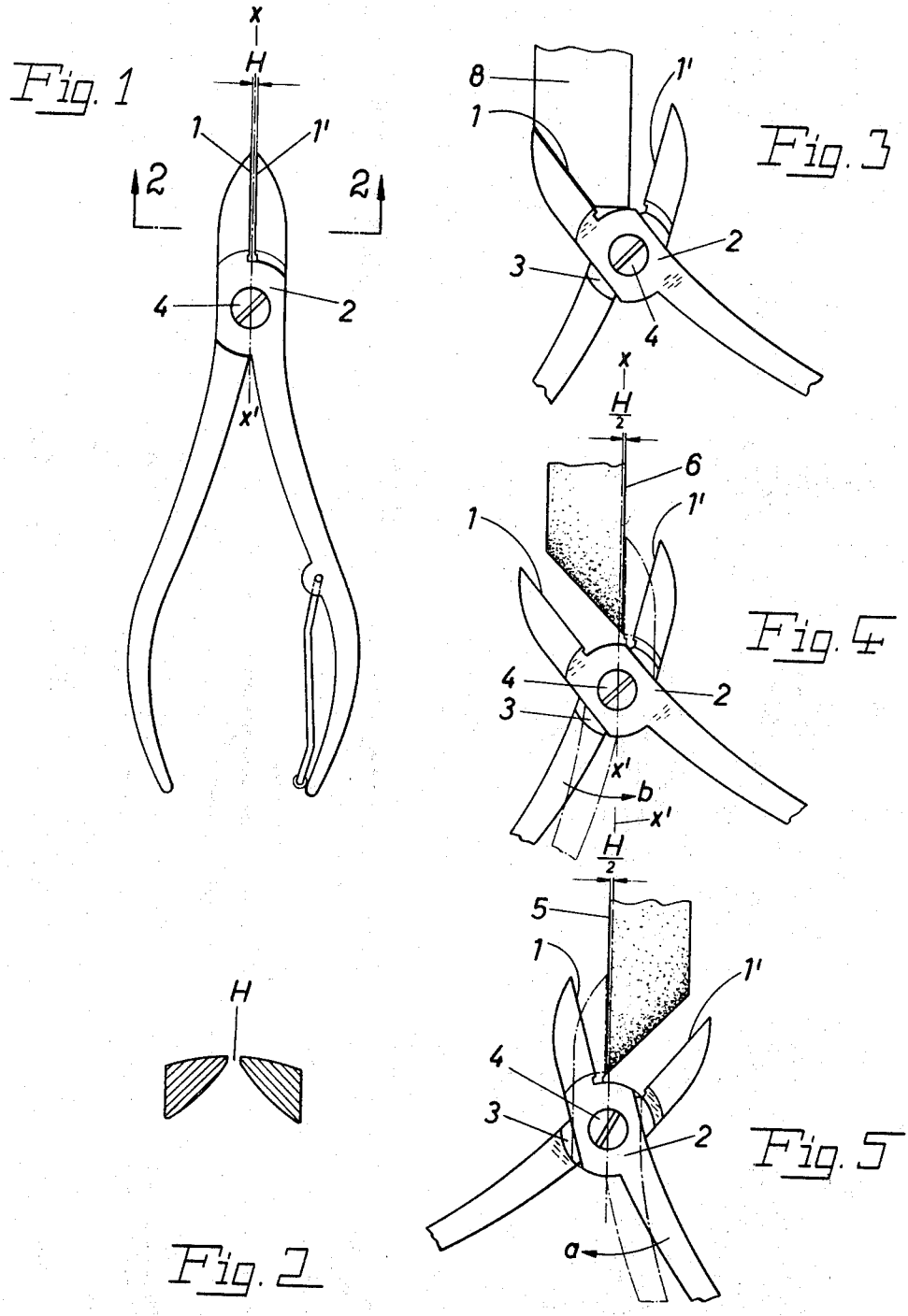

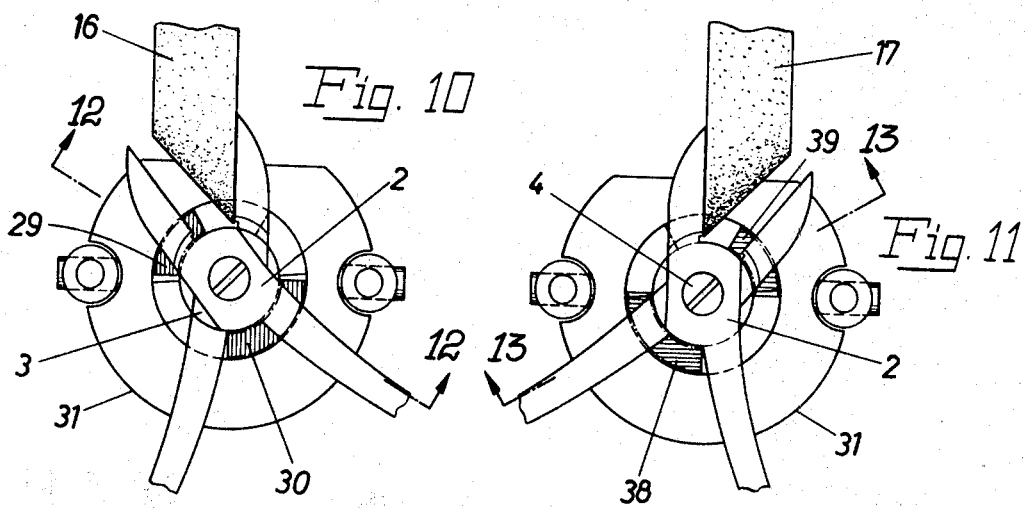
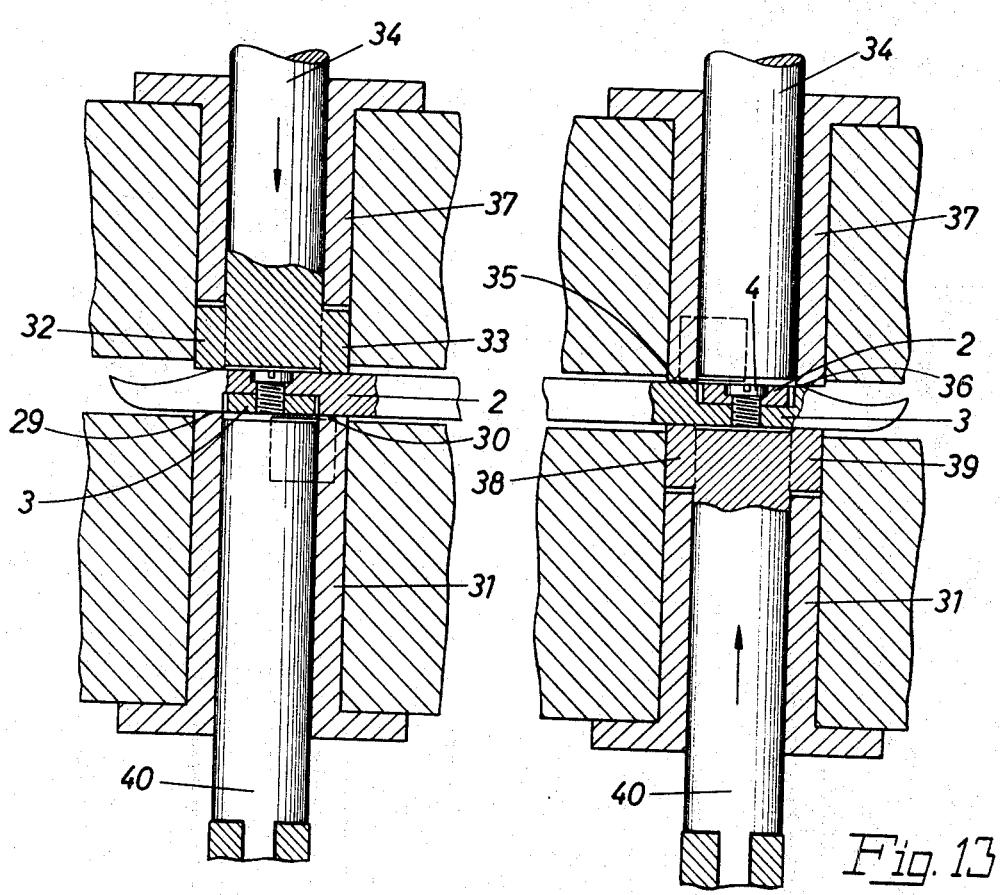

United States Patent Office 3,533,197
Patented Oct. 13, 1970

3,533,197
METHOD OF SHARPENING THE CUTTING EDGES OF SIDE CUTTING PLIERS, PARTICULARLY NIPPERS
Hanfried Heitmuller, Solingen-Widdert, and Horst Grafe, Wuppertal-Barmen, Germany, assignors to J. A. Henckels Zwillingswerk AG., Solingen, Germany, a corporation of Germany
Filed Mar. 27, 1967, Ser. No. 626,249
Claims priority, application Germany, Mar. 25, 1966, H 58,906
Int. Cl. B24b *3/52;* B21k *11/00*
U.S. Cl. 51—285                                        1 Claim

ABSTRACT OF THE DISCLOSURE

A method of and apparatus for grinding the cutting edges of side cutting pliers, particularly nippers which include a bolt pivotally connecting two nippers and is performed such that the cutting edge of the nipper to be ground swings by turning about a pivot bolt which is rigidly secured by clamping the upper nipper towards one grinding disc working face, which operates over the entire length of the cutting edge of the nipper to be ground.

---

The present invention relates to a method of sharpening the cutting edges of side cutting pliers, particularly nippers.

In nippers of this type, the cutting edges move towards each other, so that the nails or the like can be nipped off. For a good cutting of such nippers a tight closing of the cutting edges over the entire length of the cutting edges is required. Since this requirement causes on the manufacturing technique appreciable difficulties, it is known to use the forming capacity of the two nippers in such a manner, that the cutting edges engaging merely at their points during slight closing engage each other tightly and upon strong pressing together of the cutting edge by an elastic form change.

As a rule, the corresponding working of the cutting edges, particularly in so-called nippers, is performed by hand and in particular by means of files. This working known as "tight filing" requires skilled special workers and is, thus, rather expensive.

It is, therefore, one object of the present invention to provide a method of sharpening the cutting edges of side cutting pliers, particularly nippers, wherein an advantageous mechanical grinding working of the cutting edges in side cutting pliers, particularly nippers, is obtained.

Thus, preferably, cutting edges are intended thereby, which form in parallel position a gap of a few hundredths of a millimeter.

It is, thus, one object of the present invention to provide a mechanical method of grinding the cutting edges, in which the cutting edge margin of the nipper to be ground by swinging about the bolt rigidly retaining the other nipper by clamping is turned towards the grinding disc working face operating over the entire length of the cutting edge.

Due to this solution, to grind the nipper by using the bolt as swinging axis, an exact production and economically advantageous manufacturing is made possible, one obtains appreciable time and wage savings, as well as an equalized edge geometry and can grind the nippers advantageously also in its mounted state.

In order to avoid dislocations during reclamping of the work piece, in accordance with the present invention the operation is performed such, that after the grinding of the cutting edge of the one nipper, the latter is clamped in and only thereafter the other nipper is released from its clamped position and its cutting edge swings towards the grinding disc working face.

Due to this arrangement, the position of the rotary point of the swinging movement remains unchanged, whereby an advantageous exploitation of the grinding can be obtained.

An apparatus for grinding the cutting edges, which is easy to operate and advantageous for the performance of the method is designed in accordance with the present invention such, that the grinding disc working face steps over up to the half measure of the gap present in the parallel position of the cutting edges beyond the longitudinal median-plane of the parallel gap.

This arrangement makes possible a mechanically simple structure of the apparatus and a control simplifying the performance of the grinding. In a most advantageous step, the longitudinal median plane extends through the bolt.

One can in a structurally easiest arrangement of the apparatus arrange, in accordance with the present invention, two grinding disc working faces and a relative movement thereof to the bolt of the clamped nipper such, that the cutting edge of the one nipper is ground with one grinding disc working face and the cutting edge of the other nipper on the other grinding disc working face.

For the purpose of a fast change of the work piece in such apparatus, in accordance with the present invention, an abutment for the adjusted mounting of the nippers in the clamping tool is provided.

In order to make possible that such clamping tool can be advantageously controlled within the cycle of the working steps, in accordance with the present invention the clamping tool has two cross-wise disposed pairs of jaws, of which under circumstances one pair serves the clamping of the one nipper, while the swingability of the other nipper is maintained.

In order to achieve a safe clamping of the work piece in the clamping tool, in accordance with the present invention, the jaws of the one pair are formed as sector-shaped end faces of a sleeve and those of the other pair as wings of an axially displaceable pressure bolt.

Furthermore, it is structurally of advantage to align, in accordance with the present invention, the wings of the pressure bolt in axial direction with the sector-shaped end face of the sleeve.

With these and other objects in view which will become apparent in the following detailed description, the present invention will be clearly understood in connection with the accompanying drawings, in which:

FIG. 1 is a side elevation of nippers designed in accordance with the present invention;

FIG. 2 is a section along the lines 2—2 of FIG. 1, at an enlarged scale;

FIG. 3 is a fragmentary elevation showing schematically the mounting of a clipper by adjusting the clamping position;

FIG. 4 is a schematic showing of the first working step of the method of the present invention;

FIG. 5 is a schematic showing of the second working step of the present invention;

FIG. 10 is a horizontal section through the clamping tool in addition to a clamp nipper in grinding position of the one nipper;

FIG. 11 is a corresponding section indicating the grinding position of the other nipper;

FIG. 12 is a vertical section along the lines 12—12 of FIG. 10; and

FIG. 13 is a similar section along the lines 13—13 of FIG. 11.

Figure 6:
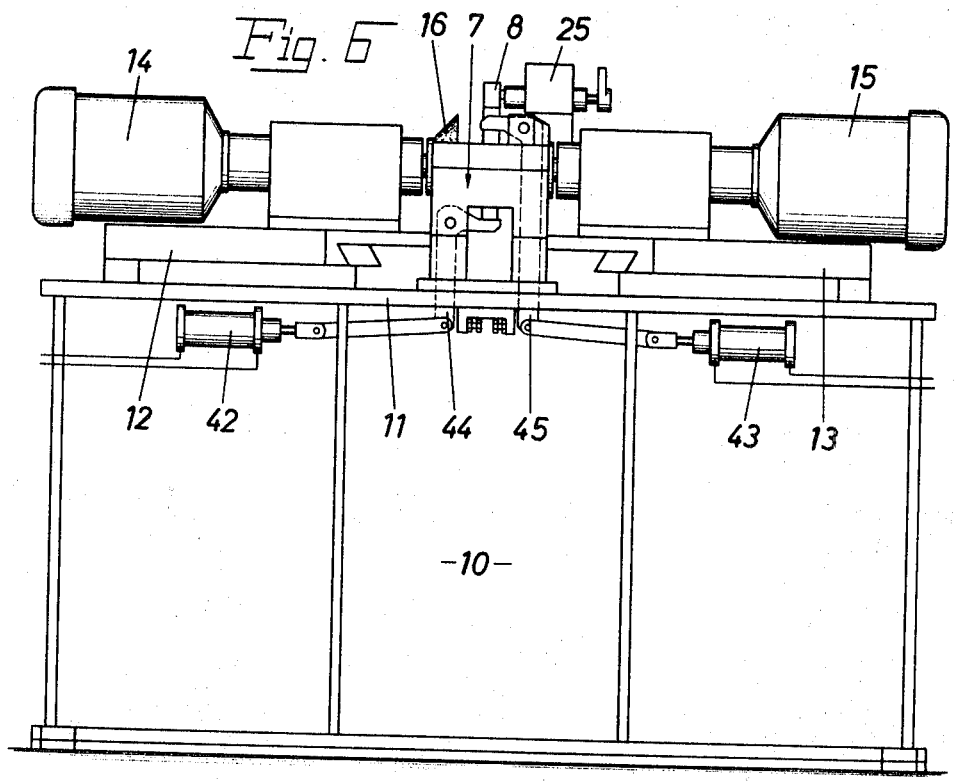
FIG. 6 is a front elevation of an apparatus for the performance of the method, shown by example.

Referring now to the drawings, and in particular to FIG. 1, the method for grinding the edges of so-called side cutting pliers, in particular of nippers, in accordance with the present invention, is disclosed and its working steps are shown in FIGS. 3, 4 and 5. It resides substantially in an arrangement according to which the cutting edge 1 of one of the nippers 2 to be ground swings in the direction of the arrow *a* (FIG. 5) about the bolt 4 immovably retained by clamping of the other nipper 3 towards the grinding disc working face 5 extending over the entire length of the cutting edge 1.

Then, after the grinding of the cutting edge 1 of the one nipper 2, the latter is clamped (FIG. 4) and thereafter, the other nipper 3 is released from its clamping position and its cutting edge 1′ swings towards the grinding disc working face 6.

In order to obtain the swingability, the mounted nipper work piece is a clamping tool 7 (FIGS. 10 and 11) and in particular by adjusting the position of the bolt 4 by means of a turnable abutment templet (FIG. 3).

By the above-described method, due to the approaching of the cutting edge towards the grinding disc working face, a straight line disposed perpendicularly to the swinging axis of the nipper (FIG. 2) is produced. If one now permits that the grinding disc working face 5 and 6 steps over up to the half measure of the cutting edge gap H present in the parallel position of the cutting edges beyond the plane X–X′ extending through the axis of the bolt 4, one obtains the nipper formation shown in FIG. 1.

During a slight exertion of pressure, these cutting edges engage each other, as before, only at their points. Upon strong exertion of pressure the cutting edges engage then over their entire length due to the possible elastic form change rigidly towards each other. The cutting possibility is, in addition, assured also then, when the engagement line of the cutting edges does not extend through the rotary point.

Figure 7:
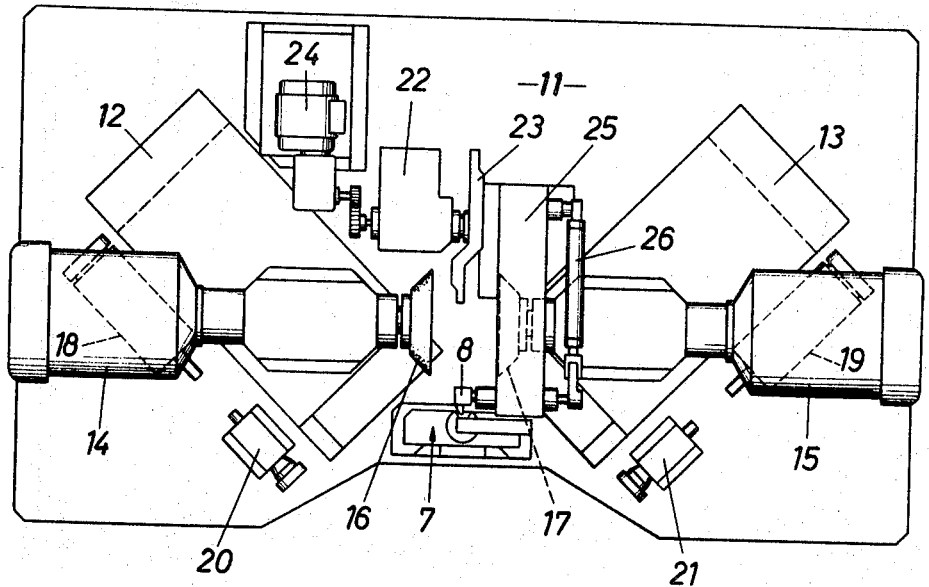
FIG. 7 is a top plan view thereof.
Figure 8:
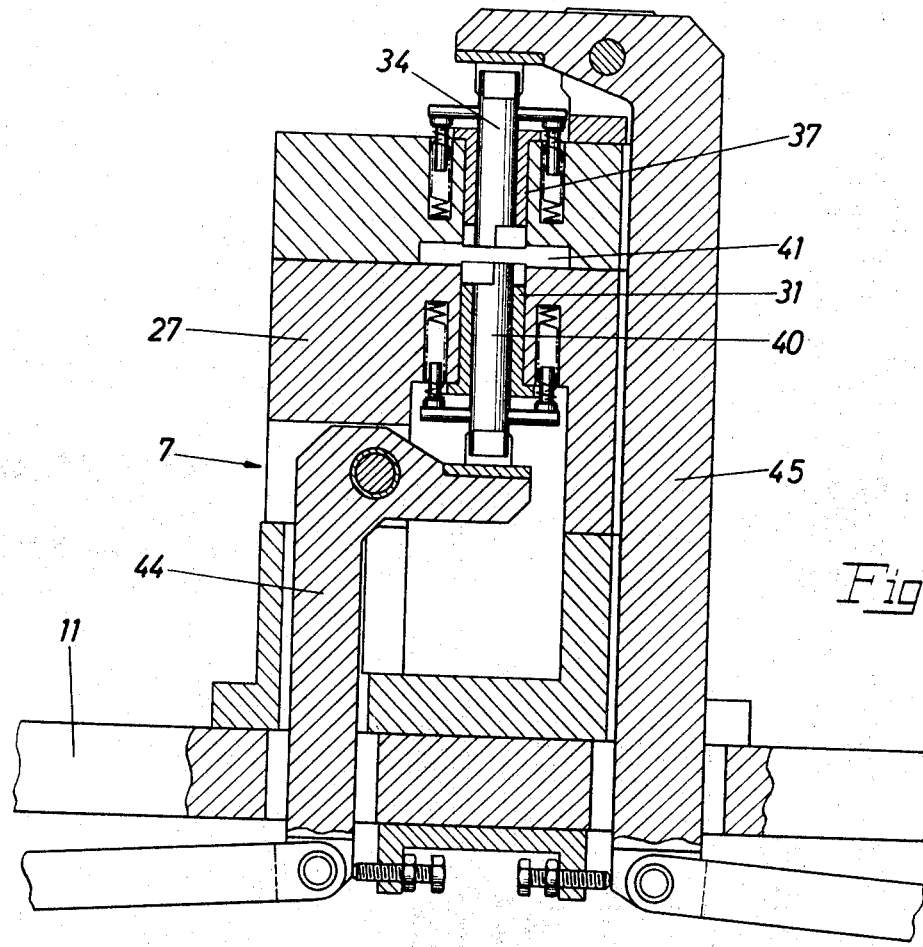
FIG. 8 is a longitudinal section through the clamping tool of the apparatus.
Figure 9:
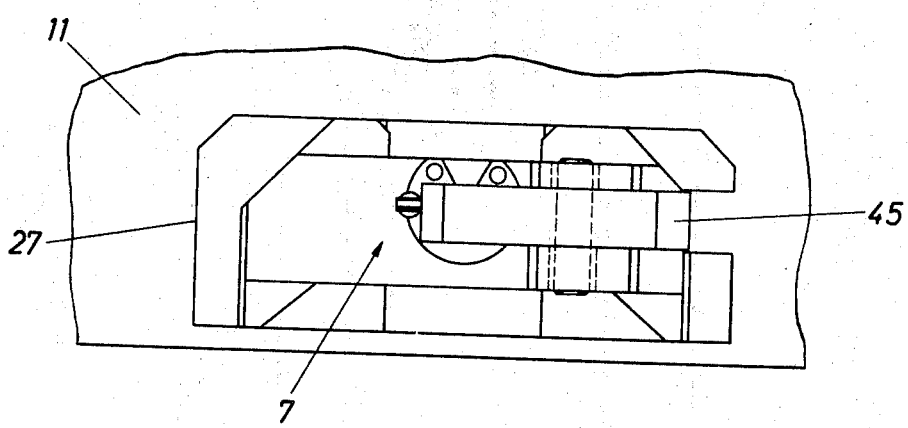
FIG. 9 is a top plan view of the clamping tool shown in FIG. 8.

The apparatus serving the performance of the method resides, as can be ascertained from FIGS. 6 and 7, in a machine frame 10 on a table plate 11 of which two supports 12 and 13 displaceable relative to each other at about a right angle, as well as a clamping tool 7 are disposed.

The supports 12 and 13 carry each a grinding motor 14 and 15, on the shaft of which is disposed a grinding disc 16 and 17, respectively, the working face 5 and 6 of which, respectively, is directed towards each other. For the displacement of the supports, pressure cylinders 18 and 19 are provided, which move the grinding units into and out of working position, respectively. The working position of the grinding units is exactly adjustable by means of micrometer screws 20 and 21. The working position is chosen such, that the grinding disc working face 5 and 6, respectively, surpasses the cutting edge gap H present in the parallel position of the cutting edges 1 and 1′ for half of the measure beyond the plane X–X′ extending through the axis of the bolt 4.

Furthermore, an aligning device 22 is also disposed on the table 11, the grinding tool 23 of which aligning device 22 is rotated by a motor 24, whereby the working edge operating the working face 5 or 6 can be applied to the grinding disc 16 or 17.

A templet 8 serving the adjustment of the work piece in the clamping tool is provided on an arm 25 secured to the table plate 11. The template 8 secured to a swinging arm can be controlled by means of a pressure cylinder 26 in and out of abutment position, respectively.

The clamping tool 7 comprises a stand 27 which has two clamping pairs disposed crosswise relative to each other, whereby one pair serves the clamping of one nipper while maintaining the swingability of the other nipper. The nipper pairs are formed by a sector section 29 and 30, respectively, of a lower sleeve 31, as well as by wings 32 and 33, respectively, of an upper stamp 34, which releases the one pair and, in addition, by the sector sections 35 and 36 of an upper sleeve 37 and the wings 38 and 39 of a lower stamp 40, which wings 38 and 39 form the other pair. The sleeves 31 and 37 have corresponding recesses into which the wings enter, in order that the wings are aligned with the sector shaped end faces (FIGS. 10–13).

The work piece, for instance, nippers, are inserted into the receiving gap 41 of the clamping tool 7, until it engages an abutment member 8 in accordance with the showing of FIG. 3. Then, the corresponding clamping lever 44 or 45 is operated by means of the control cylinder 42 or 43. As can be ascertained from FIGS. 12 and 13, the nipper 2 or 3 disposed between the operated clamping members is clamped such, that in the first place (FIG. 12) the nipper 3 remains movable, while in the second case (FIG. 13), the nipper 2 is swingable.

The grinding of the cutting edge of the swingable nipper can also take place by swinging the cutting edge by hand, for instance. Due to the pneumatic or hydraulic operation of the apparatus requiring a certain force, a very fast operation or working is obtained.

Instead of two displaceable grinding discs, the latter can also be mounted immovably and the clamping tool can be made movable in corresponding manner, for instance, on a cross table.

During a somewhat narrower grinding disc, the latter or the work piece also can perform an oscillating movement.

While we have disclosed one embodiment of the present invention, it is to be understood that this embodiment is given by example only and not in a limiting sense, the scope of the present invention being determined by the objects and the claim.

We claim:

1. A method of grinding the cutting edges of side cutting pliers, particularly nippers, including a bolt pivotally connecting two nippers, and comprising the step of:

swinging the cutting edge of one of the nippers to be ground by turning said one of said nippers about a pivot bolt connecting said nippers and rigidly secured by clamping the other nipper towards one grinding disc working face operating over the entire length of said cutting edge, clamping said ground nipper upon terminating said grinding step, thereafter releasing said other nipper from its clamped position, and swinging the cutting edge of said other nipper towards another grinding disc working face.

References Cited

UNITED STATES PATENTS 1,063,391  6/1913  Rodgers.
2,563,373  8/1951  Roeder _____ 51—125.5 X HAROLD D. WHITEHEAD, Primary Examiner U.S. Cl. X.R.

76—82.2, 104